United States Patent [19]

Rauckman

[11] Patent Number: 5,474,498

[45] Date of Patent: Dec. 12, 1995

[54] COMBINE HARVESTER SHIELDING

[76] Inventor: Dale Rauckman, Box 665, Kamsack, Saskatchewan, Canada, S0A 1S0

[21] Appl. No.: 210,494

[22] Filed: Mar. 21, 1994

[51] Int. Cl.⁶ .................................................. A01F 12/54
[52] U.S. Cl. .......................................... 460/117; 460/119
[58] Field of Search ...................... 460/119, 117, 460/149, 150

[56] References Cited

U.S. PATENT DOCUMENTS 3,760,813  9/1973  Mathews .................................. 460/119
4,741,411  5/1988  Stricker .................................... 181/283

Primary Examiner—Terry Lee Melius
Attorney, Agent, or Firm—Murray E. Thrift; Adrian D. Battison

[57] ABSTRACT

A shielding system for the engine compartment of a combine harvester includes shields that are mounted around the engine coolant radiator to close openings around the radiator communicating between the engine compartment and outside ambient conditions. It has been found that the high speed air flow drawn through the radiator by the cooling air fan will induce a large flow of air through openings around the radiator, carrying with it dust, chaff and other foreign material that is deposited in the engine compartment.

8 Claims, 3 Drawing Sheets

COMBINE HARVESTER SHIELDING

FIELD OF THE INVENTION

The present invention relates to combine harvesters and more particularly to a shield system for the engine compartments of certain rotary combine harvesters.

BACKGROUND

Some rotary combine harvesters that have their engine compartments at the top, rear of the harvesters are subject to certain problems. These include belt slippage, sometimes ascribed to failure of the torque sensing unit, and engine compartment fires.

The applicant has now discovered the source of a number of these problems. It has been discovered that with the engine running, the high speed air current drawn through the engine coolant radiator by the cooling fan creates low pressure zones around the radiator, thus inducing an air flow into the openings in the engine compartment around the radiator. This may, depending on ambient conditions, create an air flow in which large amounts of dust, chaff and straw are suspended. This flow is initially into the engine compartment, but it has been found that the entire back end of the combine may be enveloped in a cloud of this particulate matter. This results in the build-up of deposits in the engine compartment and plugging of the air filter, which is in the cloud of material at the back of the combine.

When chaff and dust enter the engine compartment, a number of things can happen. The rotor or power take-off belts may slip. The torque sensing unit on the rotor drive may fail and cause the rotor belt to slip or break. Dust may build up on the hydrostatic motor, exhaust manifold, turbo charger, batteries and on the back deck of the engine compartment, creating a fire hazard. Dust may also build up behind the engine crankshaft pulley, alternator pulley and water pump pulley. Friction in those areas may heat the dust sufficiently that it begins to smolder.

The dust cloud around the back of the combine may be sufficiently thick that the air filter becomes plugged. This may in turn plug the aspirator hose to the exhaust pipe, causing a fire in the hose and burning the air filter. The burned filter will allow dust to enter the engine and cause damage to the engine.

The hydrostatic cooler in the engine and belt compartment can also plug with dust, resulting in heating problems.

The present invention proposes a solution to these problems by blocking the induced air flow around the radiator.

SUMMARY

According to the present invention there is provided a shielding system for the engine compartment of a combine harvester in which the engine compartment houses an engine, an engine coolant radiator, a fan for drawing air through the radiator and openings in the engine compartment around the radiator, the shielding system comprising shield means blocking the openings in the compartment around the radiator for impeding a flow of air into the engine compartment around the radiator induced by the flow of air produced by the fan.

The shielding will preferably include three shields, one closing the opening below the radiator, one closing the opening along one side of the radiator opposite the air inlet for the cooling air, and a third shield on the opposite side of the radiator, closing the opening to the back deck of the engine compartment.

According to another aspect of the present invention there is provided in a combine harvester having an engine compartment, an engine in the compartment, an engine coolant radiator mounted in the engine compartment and a fan for drawing ambient air through the radiator into the engine compartment, the improvement comprising shield means around the radiator for preventing an induced air flow into the engine compartment around the radiator.

BRIEF DESCRIPTION OF THE DRAWINGS

In the accompanying drawings, which illustrate an exemplary embodiment of the present invention.

DETAILED DESCRIPTION

Figure 1:
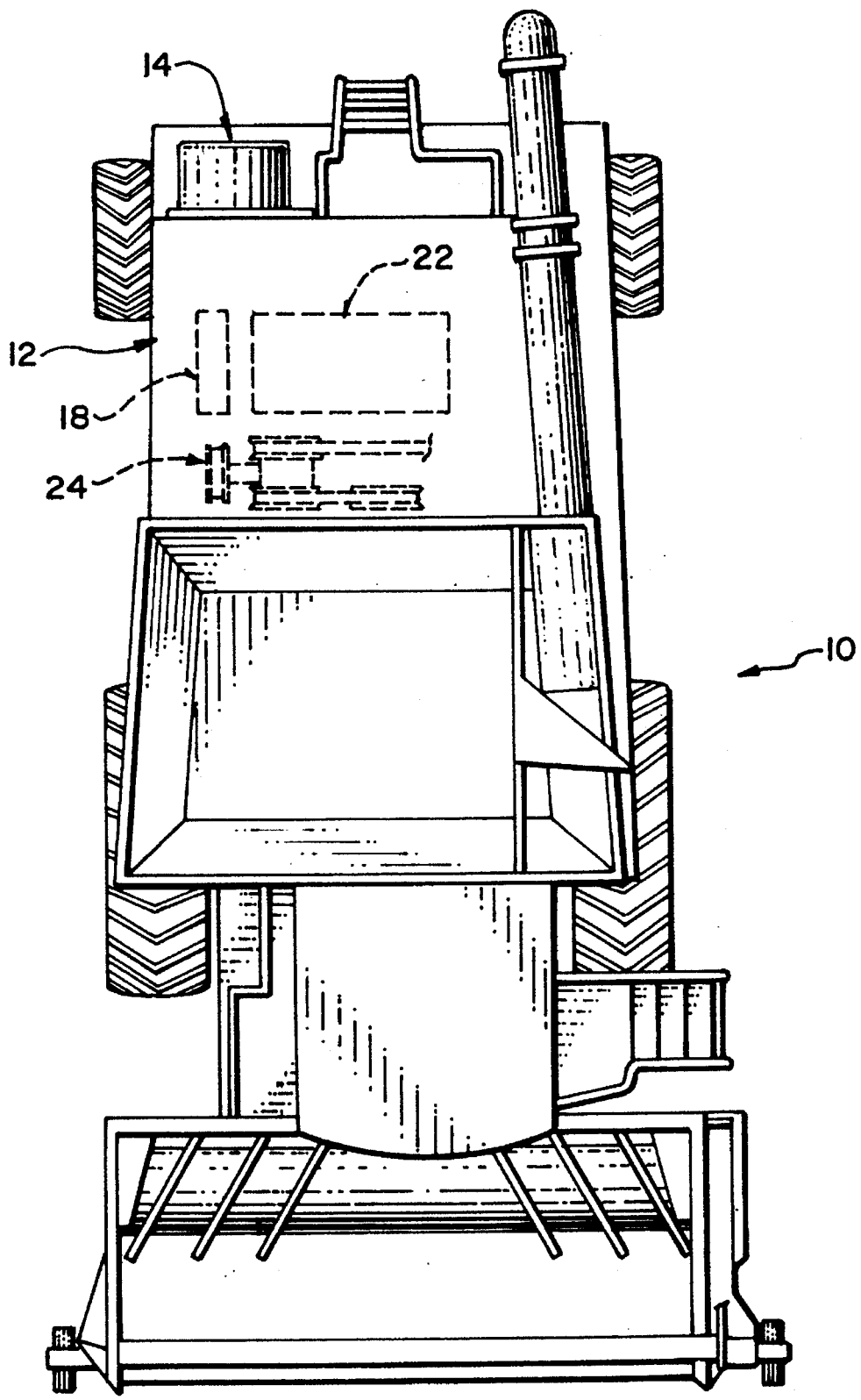
FIG. 1 is a plan view of a combine harvester.
Figure 2:
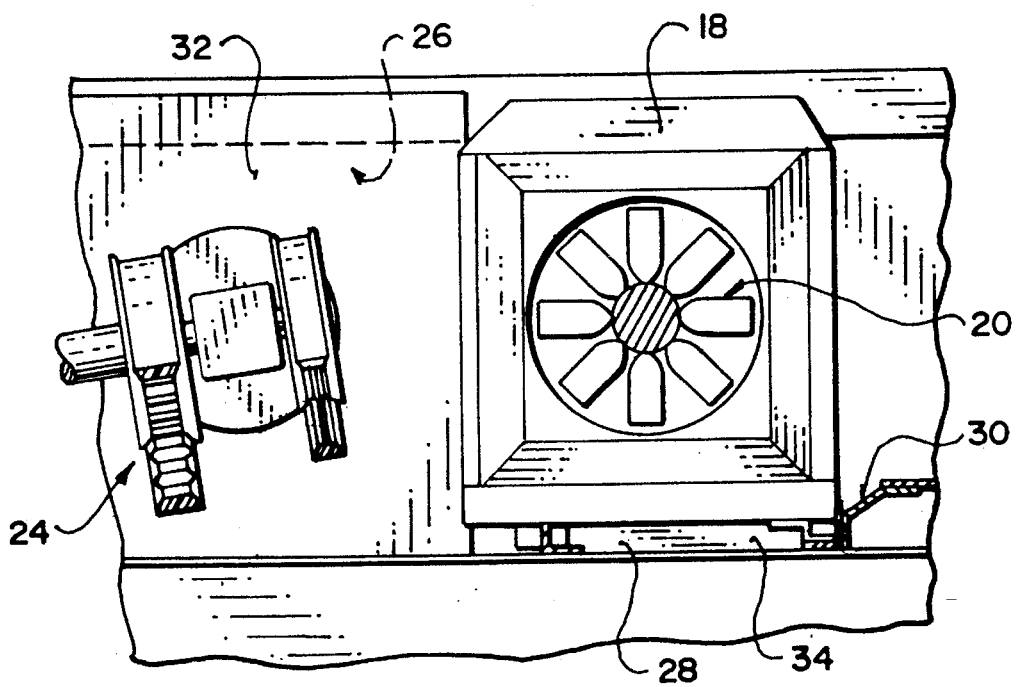
FIG. 2 is a view of the engine compartment from inside the radiator.

Referring to the accompanying drawings, FIG. 1 illustrates a combine harvester 10 that has an engine compartment 12 at the rear of the harvester. The engine compartment has a cooling air inlet 14 that is positioned above the straw spreader (not shown). The inlet leads to an engine coolant radiator 18, Air is drawn through the radiator by a cooling fan 20 (FIG. 2). The engine compartment also houses an internal combustion engine 22 and various belt drives 24 for the combine.

Figure 3:
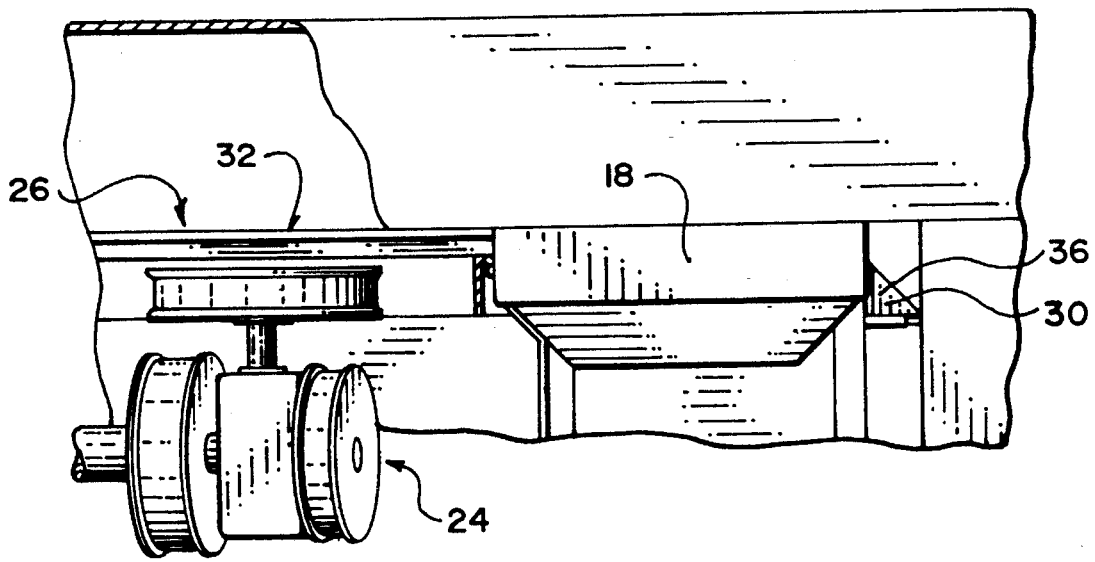
FIG. 3 is a view of the engine compartment from above the radiator.
Figure 4:
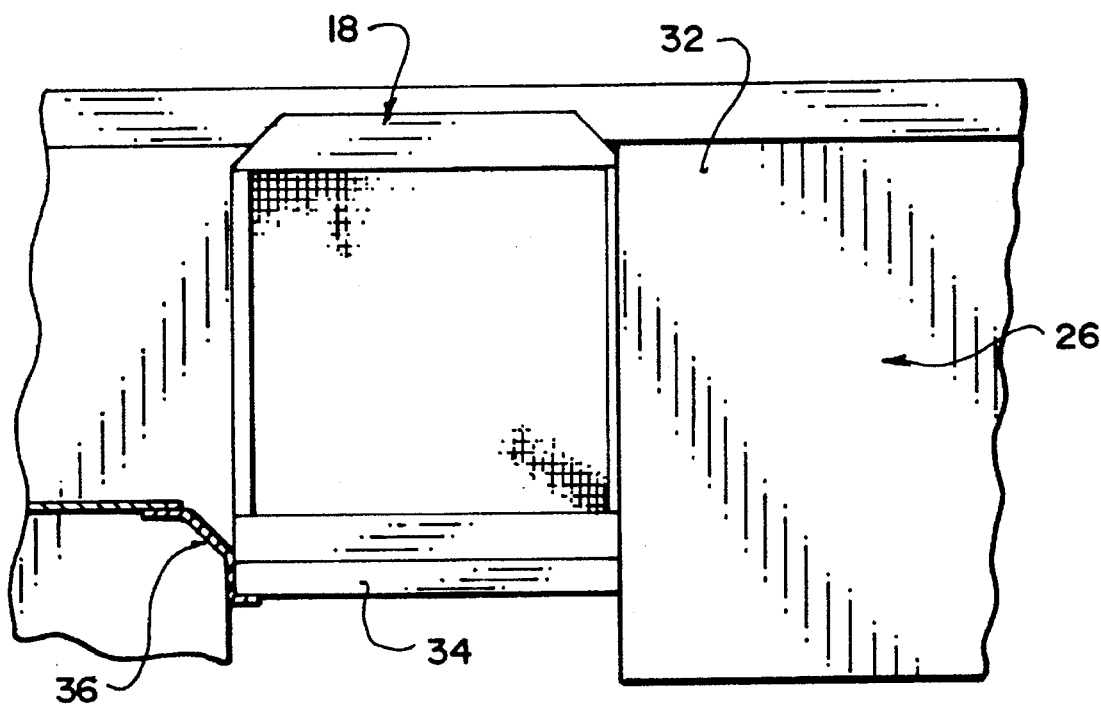
FIG. 4 is a view of the engine compartment from outside the radiator, with the inlet duct omitted.

As illustrated most particularly in FIGS. 2, 3 and 4, there is a large opening 26 along one side of the radiator 18, an opening 28 along the bottom of the radiator and a smaller opening on the side of the radiator opposite opening 26, near the bottom. In normal operation of the combine harvester, the cooling air fan 20 draws air through the radiator 18 at a speed sufficient to induce a heretofore unrecognized additional air flow into the engine compartment through the openings 26, 28 and 30. This induced flow carries with it quantities of dust, chaff and other debris that will be deposited in the engine compartment and generate a cloud of dust around the back of the combine, interfering with the normal operation of the combine, as discussed above.

To inhibit this flow, a shield 32 is installed in the opening 26, extending from the side of the radiator 18 laterally across the opening to block off the induced flow around the side of the radiator and directly into the belt drives 24, A second shield 34 is positioned beneath the radiator, extending from the radiator to the frame member on which it is supported to block off flow through the opening 28. The smaller opening 30 is closed with a third shield 36.

With the shields 32, 34 and 36 in place, the low pressure areas around the radiator produced by the large air flow drawn through the radiator by the fan 20 are not exposed directly to outside ambient conditions, so that the induced flow from outside the combine into the engine compartment is inhibited and the accompanying inflow of dust, chaff and other foreign matter is likewise curtailed.

While one embodiment of the present invention has been described in the foregoing, it is to be understood that other embodiments are possible within the scope of the invention. The shields may be installed on a retrofit basis or an equivalent arrangement can be provided with original equipment. The present invention is thus to be considered limited solely by the scope of the appended claims.

I claim:

1. A shielding system for the engine compartment of a combine harvester in which the engine compartment houses an engine, an engine coolant radiator, a fan for drawing air through the radiator and openings into the engine compartment around the radiator, the shielding system comprising shield means extending around the radiator and blocking said openings in the compartment around the radiator for impeding a flow of air into the engine compartment around the radiator induced by the flow of air through the radiator produced by the fan.

2. A shielding system according to claim 1 wherein the shield means comprise a first shield opening and closing an opening below the radiator.

3. A shielding system according to claim 2 wherein the shield means comprise a second shield closing an opening at one side of the radiator.

4. A shielding system for the engine compartment of a combine harvester in which the engine compartment houses an engine, an engine coolant radiator, a fan for drawing air through the radiator and openings in the engine compartment around the radiator, the shielding system comprising for the engine compartment of a combine harvester in which the engine compartment houses an engine, an engine coolant radiator, a fan for drawing air through the radiator and openings in the engine compartment around the radiator, the shielding system comprising shield means including:

- a first shield opening and closing an opening below the radiator;
- a second shield closing an opening at one side of the radiator: and
- a third shield closing an opening adjacent the opposite side of the radiator.

5. In a combine harvester having an engine compartment, an engine in the compartment, an engine coolant radiator mounted in the engine compartment, a fan for drawing air through the radiator into the engine compartment and openings in the compartment around the radiator through which an air flow into the compartment is induced by an air flow drawn through the radiator by the fan, the improvement comprising shield means positioned adjacent and extending around the radiator for preventing the induced air flow into the engine compartment around the radiator.

6. A combine harvester according to claim 5 wherein the shield means comprise a first shield opening and closing an opening below the radiator.

7. A combine harvester according to claim 6 wherein the shield means comprise a second shield closing an opening at one side of the radiator.

8. A combine harvester according to claim 7 wherein the shield means comprise a third shield closing an opening adjacent the opposite side of the radiator.

\* \* \* \* \*